United States Patent Office 3,376,333
Patented Apr. 2, 1968

3,376,333
SULFURIC ACID ESTERS OF LINEAR SECONDARY ALCOHOL ETHOXYLATES AND SALTS THEREOF AND METHOD OF PRODUCING SAME
Robert Ernst and Majda Comar, Los Angeles, Calif., assignors to Textilana Corporation, Hawthorne, Calif., a corporation of California
No Drawing. Filed Nov. 16, 1964, Ser. No. 411,571
10 Claims. (Cl. 260—458)

ABSTRACT OF THE DISCLOSURE

A composition of matter consisting essentially of sulfuric acid esters of ethoxy linear saturated alcohols having the general formula

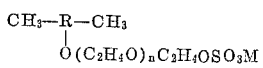

where R is a linear unsubstituted alkyl chain of from about 6 to about 18 carbon atoms, $n$ is a number from 0 up to about 19 and M is chosen from the group consisting of $NH_4$, lower alkanol amines, and alkali metals, said composition having an activity percent in excess of about 90% on a 100% solids basis, and a percent impurity of less than about 8% on a 100% solids basis and a process for making the above composition in which M is the ammonium ion by reacting an alcohol having the formula

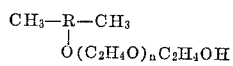

in which R and $n$ have the meaning given above, with sulfamic acid and subsequently, if desired, replacing the ammonium ion with an alkali metal or a lower alkanol amine by heating the ammonium salt with an alkali metal containing base, or an alkanol amine, the product being useful as a detergent in shampoos or cosmetic preparations.

---

This invention is directed to, and has for its object, methods of production of and compositions of matter comprising sulfuric acid esters of ethoxy linear saturated secondary alcohols, said esters having the general formula

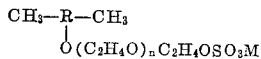

where R is a straight, i.e., linear unsubstituted alkyl chain of from 6 to 18 carbon atoms $-CH_2(CH_2)_{4-16}CH_2-$ in a carbon-carbon chain, making, with the terminal methyl groups, $C_8$ to $C_{20}$ straight unsubstituted saturated linear carbon-carbon chains. Preferably, R is 9 to 14 carbon atoms. The ethoxy group $(C_2H_4O)_n$ may be linked to any R carbon atom other than the above terminal methyl groups, and $n$ may be zero or any number one or more up to about 19, and preferably is 1 to 5. Where $n$ is 0, the compound is an ester of an ethylene glycol ether; and where $n$ is more than 1, it is an ester of a polyethylene glycol ether of a linear unsubstituted saturated secondary alcohol.

This invention also relates to, and has for its object, mixtures of such sulfates.

M is a monovalent cation, i.e., a water-dispersible salt-forming (cationic) radical including $NH_4$, primary, secondary and tertiary lower alkanolamines, for example, the mono, di and tri ethanolamines, propanolamines, and isopropanolamines, and the alkali metals, preferably sodium or potassium. It is preferred to employ the alkanolamines which are themselves water soluble or otherwise dispersible in water, as, for example, colloidally dispersible, and to employ those salt-forming cations M which produce salts of the ester which are water soluble or otherwise dispersible in water, for example, colloidally dispersible.

Since sulfation with sulfamic acid results in situ formation of the ammonium salt of the sulfuric acid ester, the ammonium salt will have to be replaced with a sodium, potassium or alkanolammonium ion by heating an aqueous solution of the ammonium salt with caustic soda, caustic potash or the above alkanolamines, while driving off the replaced ammonia gas, where such other salts are desired to be produced.

This invention is also directed to, and has for its object, a process of sulfation of the corresponding ethoxy linear unsubstituted alkyl secondary alcohol, and also the sulfation of the above mixtures of said alcohols.

It is a characteristic of such compounds that they contain a primary alcohol group. It would be expected from the prior art that such compounds would be readily and smoothly sulfated by conventional sulfating agents such as sulfuric acid, oleum, sulfur trioxide and chlorosulfonic acid in the manner conventional for the sulfation of primary alcohols of like molemular weight and chain length. Further, it is stated in the prior art that the polyethoxy acyclic secondary alcohols with substituted side chains on the acyclic radical which contain 9 or more carbon atoms in the linear, but substituted, chain may be sulfated by such sulfating agents to obtain detergents which produce good foams. See Kosmin U.S. Patents 2,637,740 and 2,644,831.

We have found that, contrary to what would be expected from the teachings of the above prior art, when such methods of sulfation are applied to the ethoxy secondary alcohols having linear alkyl radicals which do not have side chain substitutions as in the Kosmin patents, but are linear and saturated, and of the above-identified structure, the sulfates produced include undesirable quantities of a side reaction product and are of poor color and odor and generally inferior surface active properties, which deleteriously affects the utility of these products as detergents or shampoos or for use in cosmetic preparations. This is true even though precautions are taken to moderate the vigor of the reaction.

We have made a surprising discovery that sulfamic acid $NH_2SO_3H$ will produce a smooth sulfation of ethoxy unsubstituted linear saturated secondary alcohols having chain lengths $C_8$ to $C_{20}$ without deleterious side reactions and produce detergents of good color having greater foaming power, and will produce more stable foams than the products produced by sulfation of the ethoxy secondary alcohols of like carbon-carbon chain length by the conventional sulfating agents, as stated above.

This is a surprising discovery, since it would be expected that the higher temperature level which must be employed in sulfamic acid sulfation would give rise to side reactions in excess of those to be expected in sulfation processes of the prior art employing sulfuric acid or chlorosulfonic acid or dilute vapors of $SO_3$. It is therefore surprising to find that sulfamic acid reacts in a substantially different manner in sulfation of the ethoxy linear aliphatic alcohols employed in the process of our invention than do $SO_3$ and chlorosulfonic acid, and produces sulfates of much greater purity and suitability for detergents, shampoos and other cosmetic uses.

In carrying out the process of our invention to produce the sulfates of our invention, we may use the adduct product of ethylene oxide and the linear saturated secondary alcohols of one molecular form, that is, where the hydroxyl group in all of the molecules is substituted in the same position in a carbon chain. For example, we may use ethoxy linear secondary alcohols of the following formulation:

$$CH_3-R-CH_3$$
$$|$$
$$O(C_2H_4O)_nC_2H_4OH$$

Symbols R and $n$ are those previously identified.

This formula symbolizes that the linking oxygen group which links the polyalkoxy radical to a carbon of the aliphatic radical R may be positioned at any of the carbons, for example, from 2 to 18. Thus, where R has six carbon atoms, it may be on carbons 2, 3 or 4 from either terminal methyl group. Where R contains 18 carbon atoms, the linking oxygen to the ethoxy groups may be at any carbon from 2 to 17, and in the same manner for any molecule of intermediate aliphatic chain length.

However, as a practical matter, we prefer to employ mixtures of polyethoxy linear alkyl secondary alcohols. Such mixtures may be mixtures produced by the adduct reaction between ethylene oxide and mixtures of secondary alcohols whose linear carbon chain may be of different chain length. These mixtures contain molecules of such polyethoxy secondary alcohols, where the ethoxy groups in the several molecular species in the mixture are linked through the oxygen at different carbons of the alkyl chain in the molecule, giving a statistical distribution among the molecules of the mixture of secondary alcohols with the linking oxygen joined to different carbons in the alkyl chain in a statistical manner. The average value of $n$ per average mole of the sulfuric acid ester is within the range of from 0 up to about 19.

Such mixtures are commercially available and form a suitable reagent for the processes of our invention.

The process is thus flexible and effective with ethoxy and polyethoxy linear secondary saturated alcohols of any of the above chain lengths and of various positions of the linking oxygen, and is not limited to any particular position of the linking oxygen along the linear acyclic chain.

In selecting the polyethoxy linear saturated secondary alcohol, we prefer to employ those which are substantially free of ethylene glycol, polyethylene glycol, olefins and unethoxylated secondary alcohols which are sometimes present in commercially available polyethoxy linear unsubstituted alkyl secondary alcohols of the above type. Such products, when containing such impurities, when sulfated by the processes of our invention, introduce impurities into the sulfation product. In order to obtain a product of the highest purity, we wish to avoid such contaminants. The secondary alcohols and olefins may be removed by distillation, and the glycol or polyethylene glycol may be extracted with water or a saline solution or other suitable solvent.

We do not wish to imply that it is essential, in order to produce an improved product as compared to treating the same alcohols with $SO_3$ or chlorosulfonic acid or other conventional sulfating agents, that the alcohol be entirely or substantially free of such impurities, since employing any of the products, even when containing these impurities, an improved result is obtained in our process of sulfation as compared with the process employing such other sulfating agents.

As will be indicated below, commercially acceptable detergents for use as liquid detergents, shampoos or other cosmetic products will tolerate impurities as determined by carbon tetrachloride extraction of a small amount, and therefore some impurities in the alcohol to be treated are tolerable. Obviously, of course, it is desirable to employ alcohols with as low amounts of impurities as is commercially practical to obtain. We have also found that the sulfates of ethoxy and polyethoxy linear alkyl secondary alcohols produced by our process are much better foam formers and give more stable foam than those produced by the sulfation of such ethoxy linear alkyl secondary alcohols by conventional sulfating agents such as $SO_3$ and chlorosulfonic acid.

The reaction between the alcohol and the sulfamic acid is carried out employing an amount of sulfamic acid stoichiometrically equivalent to, or in molar excess of, the alcohol. We may use up to about 20% excess and preferably up to about 10% excess. The temperature of the reaction may be in the range of about 110° C. to about 150° C., preferably in the range of 110° C. to 130° C. Higher temperatures may be employed, but darkening of the product due to side reactions occurs.

The pH of the product of the reaction may then be adjusted to bring the salt to the pH desired. A coloration inhibitor, such as urea or cyanoguanidine, may be added to the sulfation reactants. Also, the product produced by the sulfation reaction may be bleached by bleaching agents such as hydrogen peroxide.

Illustrating the improvement in the process and product produced employing sulfamic acid as a sulfating agent over the conventional sulfating agents such as $SO_3$ and chlorosulfonic acid, the following examples are given by way of illustration and not as a limitation of our invention.

EXAMPLE 1

A 2000 ml. four-necked flask was fitted with a glass stirrer and Teflon paddle, dropping funnel having glass tubing with a constricted end leading to the bottom of the flask, and an inlet for dry nitrogen gas and outlet for nitrogen-hydrochloric acid mixed gas stream. The flask was charged with 387.2 grams (one mol equivalent based on hydroxyl value) of Tergitol 15-S-4.6.

It is understood that the identification 15-S stands for a mixture of secondary alcohols of the above type $$CH_3-R-CH_3$$
$$|$$
$$OH$$

where R is 9-14 carbon atoms. The product indicated by the number 4.6 is symbolized by the formula $$-CH_3-R-CH_3$$
$$|$$
$$O(C_2H_4O)_{4.6}C_2H_4OH$$

It is understood that it is the mixture of the corresponding alcohols of from about 11 to about 16 carbon atoms produced from a kerosene fraction produced by molecular sieve selective adsorption of kerosene.

One mol equivalent, or 116.5 grams, of chlorosulfonic acid was weighed into the dropping funnel and was gradually added to the vigorously agitated mixture of the ethoxy secondary alcohol over a period of about 1¼ hours. The temperature of reaction was held between 20° C.–27° C. by an ice water bath. Dry nitrogen was passed through the reaction mass throughout and following addition. The reaction mass was held at the above indicated temperature range of ½ hour following addition, and was then agitated for an additional hour under reduced pressure to remove residual HCl. The resulting acid ester was discharged into an agitated and externally cooled beaker containing the following neutralizing solution:

| | Grams |
|---|---|
| Water | 64.8 |
| Ethanol SDA 3A | 93.2 |
| Aqua ammonia 28% | 92.2 |

417.6 grams of the acid sulfate were used in the neutralization to bring the pH to 7.2. The following analytical values were found:

| | | |
|---|---|---|
| Activity by methylene blue test (molecular weight: 484.2) | percent | 46.7 |
| Total solids | do | 66.7 |
| Petroleum ether soluble matter | do | 6.1 |
| Carbon tetrachloride soluble matter | do | 8.8 |
| Color, Gardner Hellige, VCS | | 4 |

The percent of matter soluble in carbon tetrachloride is a measure of the unsulfated alcohol and by-products of side reaction.

The petroleum ether and carbon tetrachloride soluble portions were dissolved in chloroform (1 gram per 25 ml. solvent) and scanned in a Perkin & Elmer, Model 21, spectrophotometer using NaCl cells with a path of 0.5 mm. While these scans showed the presence of unconverted alcohol, there also appeared strong absorption bands centered at 5.7 microns and 5.87 microns, indicating the presence of carbonyl compounds not found with the original raw material. It is assumed that these absorption peaks result from the presence of aldehydes, other carbonyl compounds and other oxidation products, which may develop from oxidative cleavage of the alcohol by action of the chlorosulfonic acid.

The side reaction could also result in the formation of ethylene glycol and polyethylene glycol and the sulfates thereof, which would further account for the large percentage of organic compounds, which are not surface active, and which are found in the sulfated products obtained with chlorosulfonic acid sulfation and with sulfur trioxide, as shown below.

EXAMPLE 2

A Pfaudler 100-gallon glass lined reactor was fitted within an another type agitator. The following reactant weights for sulfation and neutralization were employed:

| | Lbs. |
|---|---|
| Tergitol 15–S–4.6 | 400 |
| Chlorosulfonic acid | 132 |
| Neutralized after reaction to pH 6.5–7. | |
| Water | 64 |
| Ethanol SDA-3A | 105 |
| Aqua ammonia | 103 |

The following antlytical values were obtained:

| | |
|---|---|
| Activity by methylene blue test (mol. weight: 484.2) percent | 41.4 |
| Total solids do | 60.4 |
| Carbon tetrachloride soluble matter do | 8.35 |
| pH (as is) | 6.85 |
| Color, Gardner Hellige, VCS | 3–4 |

EXAMPLE 3

800 grams (2.066 mol equivalent) of Tergitol 15–S–4.6 were charged into a Morton four-necked glass flask fitted with a glass stirrer with a Teflon blade. A gas inlet tube was provided, leading to the bottom of the reaction flask. The glass tubing was constricted to less than ¼ of its diameter at the outlet in the flask. The glass tubing was connected to a second flask in a Glas-Col heating mantle serving as the vaporizer for the $SO_3$. Dried and cooled air was led through a rotameter over the liquid $SO_3$ at rates to achieve a dilution ratio of about 94% air to 6% $SO_3$. 165.3 grams (2.066 mol equivalent) of $SO_3$ was charged in one hour with temperature rising to a maximum of 85° F. The mixture was vigorously stirred during the reaction. The sulfuric acid ester obtained was then neutralized in an agitated and externally cooled beaker, as follows:

| | Grams |
|---|---|
| Water | 271.0 |
| Ethanol SDA 3A | 172.0 |
| Aqua ammonia 28% | 108.0 |

893.9 grams of the acid sulfate were gradually added under stirring to bring the pH to 7.0.

The following analytical values were recorded with this run:

| | |
|---|---|
| Activity by methylene blue test (mol. weight: 484.2) percent | 40.4 |
| Total solids do | 63.5 |
| Carbon tetrachloride soluble matter do | 13.5 |
| Color, Gardner Hellige, VCS | 4–5 |

EXAMPLE 4

The apparatus consisted of a three-necked round bottom two-liter flask equipped with a reflux condenser, a type 316 stainless steel stirring assembly and a glass tubing leading to the bottom of the flask to permit purging with nitrogen. Tergitol 15–S–4.6—774.4 grams (2 mol equivalent) and 15 grams of cyanoguanidine as a color inhibitor were charged to the flask and heated by means of a "Glas-Col" heating mantle to 60° C. 207.8 grams (2.14 mol equivalent) of lump-free sulfamic acid was then powdered into the alcohol while under constant agitation. Nitrogen was purged through the reaction mass and the mixture heated gradually to 120° C.–125° C. This temperature was maintained for 2½ hours and a sample taken to establish the percent conversion.

The reaction mass was then cooled by removing the heating mantle, and the temperature was brought to about 80° C. 13.4 grams of monoethanolamine were carefully added under agitation to bring the pH to 8.0±0.5. At this point, 211.2 grams of ethanol SDA-3A (190 proof) were added through a dropping funnel as rapidly as reflux permits and the solution cooled to 65° C. or below. The color at this point was Gardner Hellige VCS 4. An identical run made in the absence of the cyanoguanidine resulted in a color Gardner Hellige VCS 8–9. To the product produced employing cyanoguanidine, 0.5% hydrogen peroxide (35% solution) was added, after cooling to the temperature indicated above, to further reduce the color of the finished product.

The batch was now diluted with 413.1 grams of water and brought to a pH of 6.5±0.5 with dilute sulfuric acid, while cooling to room temperature. A clear, pale amber solution resulted, having an extremely mild odor as contrasted to the sharp odor obtained with sulfation of the same raw material with chlorosulfonic acid or $SO_3$.

The following are the analytical values of the resultant product:

| | |
|---|---|
| Activity by methylene blue test (mol. weight: 484.2) percent | 56.1 |
| Total solids do | 62.0 |
| Carbon tetrachloride soluble matter do | 2.3 |
| pH (as is) | 6.8 |
| Color, Gardner Hellige, VCS | 2 |

EXAMPLE 5

Employing the apparatus described with Example 4 and using identical procedure employing Tergitol 15–S–3. Tergitol 15–S–3 is the same as Tergitol 15–S–4.6 except that the adduct is produced by using 3.0 instead of 4.6 mol equivalents of ethylene oxide. 665.0 grams (2 mol equivalent) of this product was reacted with sulfamic acid—207.8 grams (2.14 mol equivalent). Urea—6.8 grams (equal to 0.5%)— was added as a coloration inhibitor. Upon completion of sulfation as per Example 4, there was added monoethanolamine—13.4 grams, and SDA 3A ethanol (190 proof)—216.4 grams. The batch was further diluted with 226.8 grams of water to a solids content of about 65% and the pH adjusted with dilute sulfuric acid to 6.5±0.5.

A clear, light colored solution resulted, conforming to the following analytical values:

| | |
|---|---|
| Activity by methylene blue test (mol. weight: 429.6) percent | 61.0 |
| Total solids do | 64.2 |
| Carbon tetrachloride soluble matter do | 3.6 |
| Petroleum ether soluble matter do | 2.4 |
| Color, Gardner Hellige, VCS | 3 |

As a result of the use of coloration inhibitor, in this case urea, a particularly light colored product was obtained.

In place of urea, cyanoguanidine can be employed to obtain light colored products. Both of these compounds show a very gradual decomposition, yielding ammonia, at the temperatures involved during reactions as Examples 4 and 5.

A quantity of 0.2% to 2% of the inhibitor, based on the total weight of the neutralized batch, is normally best employed to achieve the desired degree of protection. Larger quantities could be utilized but are generally undesirable owing to the formation of crystalline precipitate which may form in aqueous alcoholic solution, often necessitating filtration of the finished product.

The improvement in the product produced by employing the sulfamic acid sulfation method of our invention, in contrast to that produced by using $SO_3$ or chlorosulfonic acid, is shown by the following:

| Example | Percent Solids | Color | Activity, Percent | | Impurity, Percent | |
| --- | --- | --- | --- | --- | --- | --- |
| | | | As is | 100% Solids Basis | As is | 100% Solids Basis |
| 1 | 66.7 | 4 | 46.7 | 70.0 | 8.8 | 13.2 |
| 2 | 60.4 | 3-4 | 41.4 | 68.5 | 8.35 | 13.8 |
| 3 | 63.5 | 4-5 | 40.4 | 63.6 | 13.5 | 21.3 |
| 4 | 62.0 | 2 | 56.1 | 90.5 | 2.3 | 3.7 |
| 5 | 64.2 | 3 | 61 | 95.0 | 3.6 | 5.6 |

Activity, as stated in the table and in the claims, is the activity by the methylene blue test reported above, which measures the percent of sulfuric acid esters present in the sample to be tested. The test is that reported by S. R. Epton, Trans. Faraday Society, vol. 44, pages 226–230 (1948), modified by employing Hyamine 1622. It is para di-isobutyl phenoxy ethoxy ethyl dimethyl benzyl ammonium chloride as the cationic standard solution for titration. It measures concentration of surface active agent. The "as is" value is the value based on the solution containing the percent solids as reported in the table and in the examples. The 100% solids basis is the value obtained as follows:

$$\frac{\text{``Percent activity as is'' } \times 100}{\text{Percent solids}}$$

The percent impurity, as stated in the table and in the claims, is that accounted for by the carbon tetrachloride soluble fraction. The "as is" value is that of the solution containing the percent solids reported in the table and examples. The 100% solids value is obtained as in the case of the activity value. Color is reported as Gardner Hellige VSC.

Comparing the results produced by employing the process of our invention, as compared with using chlorosulfonic acid or $SO_3$, it will be seen that a substantially pure sulfate is obtained, as compared with the impure product by the prior art methods when applied to the same reactant.

Products on 100% solids basis containing 8% or less of impurities extractable by carbon tetrachloride are most effective and are acceptable to the trade as suitable surfactants. We may thus produce products on the 100% solids basis having 8% or less of such impurities.

The foam forming properties and foam stability of the product produced by the process of our invention, as compared to that produced by employing $SO_3$ or chlorosulfonic acid, is shown in the following table. The Ross-Miles Foam Numbers are given in millimeters and are determined by the Ross-Miles method described in Oil and Soap, vol. 18, pages 99–102 (1941).

| Surfactant | Ross-Miles Foam Numbers in Millimeters | | |
| --- | --- | --- | --- |
| | Initial | After 60 Seconds | After 300 Seconds |
| [0.1% solutions (methylene blue activity basis) using distilled water] | | | |
| Example 1 | 190 | 160 | 85 |
| Example 3 | 180 | 155 | 100 |
| Example 4 | 190 | 170 | 150 |
| [0.1% solutions (methylene blue activity basis) using water of 200 p.p.m. hardness (calculated as $CaCO_3$)] | | | |
| Example 1 | 180 | 160 | 135 |
| Example 3 | 175 | 155 | 135 |
| Example 4 | 190 | 175 | 170 |

[The values were rounded to the closest 5 mm.]

While we have described particular embodiments of our invention for the purpose of illustration, it should be understood that various modifications and adaptations thereof may be made within the spirit of the invention, as set forth in the appended claims.

We claim:
1. A composition of matter consisting essentially of a sulfuric acid ester having a formulation corresponding to the general formula:

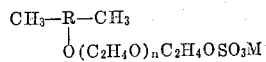

where R is a linear unsubstituted alkyl chain of from about 6 to about 18 carbon atoms, $n$ is a number from 0 up to about 19, and M is chosen from the group consisting of $NH_4$, lower alkanol amines, sodium and potassium, said composition having a percent of sulfuric acid esters in excess of about 90% on a 100% solids basis, and a percentage of carbon tetrachloride soluble impurities of less than about 8% on a 100% solids basis.

2. The composition of claim 1, in which said sulfuric acid ester is a mixture of sulfuric acid esters of the said formulation but of different chain length R, within the range of about 6 to about 18 carbon atoms, and in which the average value of $n$ per average mole of said ester is within the range of 0 up to about 19.

3. A process for producing a composition consisting essentially of a sulfuric acid ester salt corresponding to the general formula:

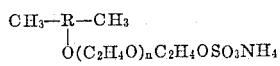

where R is a linear unsubstituted alkyl chain of from about 6 to about 18 carbon atoms, and $n$ is a number from 0 up to about 19, said composition having a percent of sulfuric acid esters in excess of about 90% on a 100% solids basis and a percentage of carbon tetrachloride soluble impurities of less than about 8% on a 100% solids basis, said process comprising mixing an alcohol of the general formula

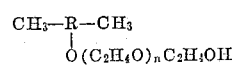

where R is a linear unsubstituted alkyl chain of from about 6 to about 18 carbon atoms and $n$ is a number from 0 up to about 19, with sulfamic acid in a molar ratio of about one mole of said alcohol to about 1 to about 1.2 moles of sulfamic acid, and maintaining said mixture at a temperature within the range of about 110° C. to about 152° C. for a period of time sufficient to substantially complete the conversion of said alcohol into said composition.

4. The process of claim 3, in which the ester salt is diluted with water and alcohol.

5. The process of claim 3, in which said alcohol is a mixture of alcohols having an average value of $n$ per average mole of alcohol of from 0 to about 19.

6. The process of claim 5, in which the ester salt is diluted with water and alcohol and neutralized.

7. The process of claim 3, adding water, alcohol and hydrogen peroxide to the ester salt, and neutralizing the same.

8. The process of claim 3, in which a coloration inhibitor, chosen from the group consisting of urea and cyanoguanidine, is added to the mixture.

9. The process of claim 8, adding water and alcohol to the ester salt, and reacting said salt with a member chosen from the group consisting of sodium hydroxide, potassium hydroxide and water dispersible lower alkanolamines.

10. The process of claim 8, in which the coloration inhibitor is added in amount within the range of from about 0.2% to about 2%.

(References on following page)

References Cited

UNITED STATES PATENTS

| | | | |
|---|---|---|---|
| 2,452,943 | 11/1948 | Malkemus | 260—400 |
| 2,637,740 | 5/1953 | Kosmin | 260—458 |
| 2,647,913 | 8/1953 | Kosmin | 260—458 |
| 3,054,820 | 9/1962 | De Jong et al. | 260—458 |

OTHER REFERENCES

Chemical Engineering, March 2, 1964, Soft Detergent Intermediates, pp. 54 and 56.

CHARLES B. PARKER, *Primary Examiner.*

L. C. MARUZO, B. BILLIAN, *Assistant Examiners.*

UNITED STATES PATENT OFFICE
CERTIFICATE OF CORRECTION

Patent No. 3,376,333   April 2, 1968

Robert Ernst et al.

It is hereby certified that error appears in the above numbered patent requiring correction and that the said Letters Patent should read as corrected below.

Column 2, line 23, "molemular" should read -- molecular --. Column 3, line 63, "shamposs" should read -- shampoos --. Column 4, lines 37 to 39, the formula should appear as shown below:

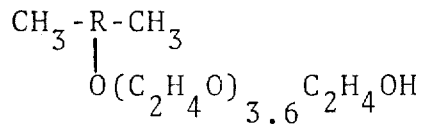

line 52, "of" should read -- for --. Column 5, line 23, "within an another" should read -- with an anchor --; line 32, "antlytical" should read -- analytical --.

Signed and sealed this 23rd day of September 1969.

(SEAL)
Attest:

EDWARD M. FLETCHER, JR.  WILLIAM E. SCHUYLER, JR.
Attesting Officer  Commissioner of Patents